United States Patent [19]
Cobb

[11] 3,947,652
[45] Mar. 30, 1976

[54] COOKING SURFACE ASSEMBLY FOR AN INDUCTION RANGE

[75] Inventor: William R. Cobb, Murrysville, Pa.

[73] Assignee: White-Westinghouse Corporation, Cleveland, Ohio

[22] Filed: June 28, 1974

[21] Appl. No.: 484,351

[52] U.S. Cl............. 219/10.79; 126/39 J; 219/464
[51] Int. Cl.² ..................... H05B 5/04; F24C 3/00
[58] Field of Search............. 219/10.49, 464, 10.79; 126/211, 214 C, 212, 218, 390, 37 A, 37 B, 39 J, 39 H, 39 I, 39 K

[56] References Cited
UNITED STATES PATENTS

| | | | |
|---|---|---|---|
| 2,715,173 | 8/1955 | Farquharson | 126/211 |
| 3,561,020 | 2/1971 | Faitzsche | 126/211 X |
| 3,632,983 | 1/1972 | Dills | 126/39 J |
| 3,710,062 | 1/1973 | Peters | 219/10.49 |
| 3,711,672 | 1/1973 | Morelaud et al. | 219/10.49 |
| 3,785,364 | 1/1974 | Reid et al. | 126/39 J |
| 3,852,558 | 12/1974 | McCleerey | 219/10.49 |

Primary Examiner—Bruce A. Reynolds
Attorney, Agent, or Firm—McNenny, Farrington, Pearne & Gordon

[57] ABSTRACT

The invention provides a support plate underlying the ceramic cooking surface of an induction range with the plate, in addition to increasing the safety of the top as it relates to particles dropped thereon, further provides means for positioning the working coils of the heating units against the undersurface of the sheet and maintaining them in proper position against lateral forces generally enncountered during transportation. The support plate is dimensioned so as to extend across the space defined by opposing flanges of a peripheral trim member engaging the edge portion of the ceramic sheet and provides structure for abutting securement to the opposing flanges through a fastening member that, in establishing the securement of the plate to the flange also forces the peripheral area of the sheet against the overlapping portion of the trim to establish sealed engagement therebetween. The cooking units are supported against the undersurface of the ceramic sheet by a non-metallic support bar removably attached to the plate. The assembly thus comprises the ceramic sheet, peripheral trim, underlying support plate, the heating unit, and support bar.

8 Claims, 3 Drawing Figures

U.S. Patent    March 30, 1976    3,947,652
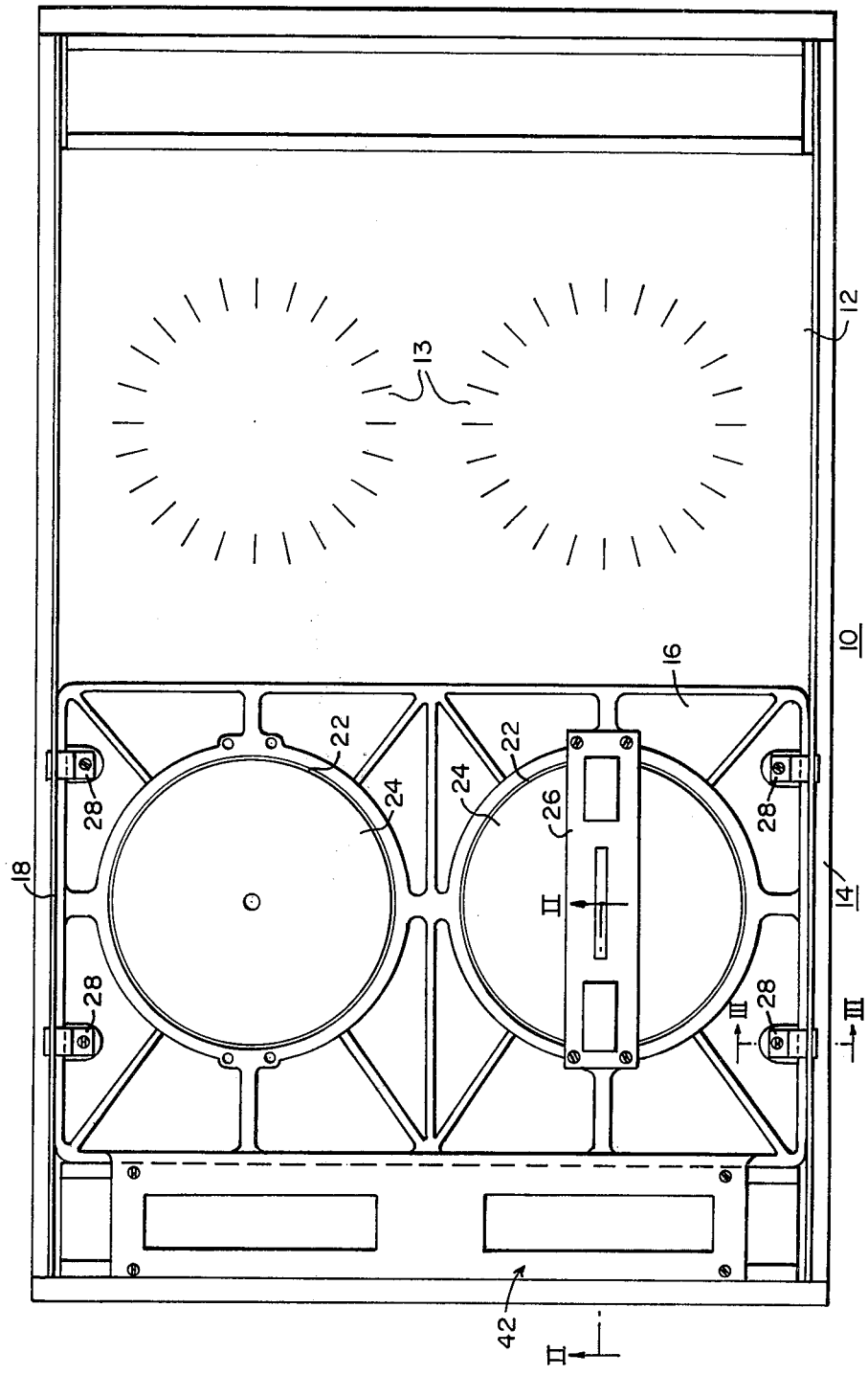
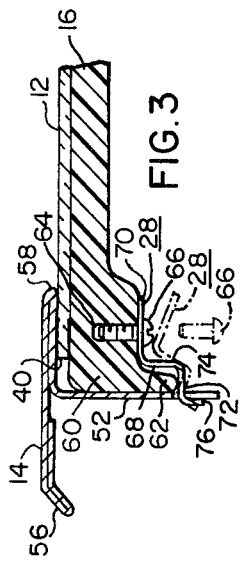
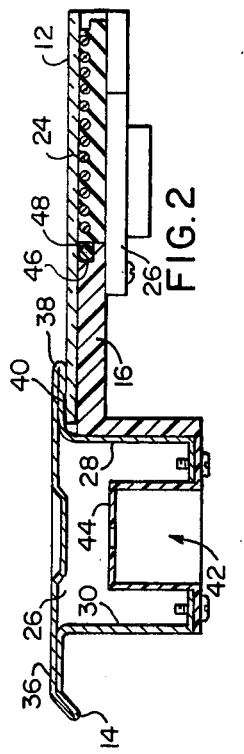

COOKING SURFACE ASSEMBLY FOR AN INDUCTION RANGE

BACKGROUND OF THE INVENTION

1. Field of the Invention

This invention relates to an induction heating cooking unit and more particularly to an assembly of the ceramic cooking surface, the heating units, and the trim, with an underlying support plate for the ceramic sheet that also fixes the position of the heating units held therein by a support bar.

2. Description of the Prior Art

Induction heating units are uniquely adaptable to a smooth-top ceramic cooking surface in that they can be positioned sub-adjacent such cooking surfaces with the generated induction fields able to be transmitted therethrough with virtually no diminution in strength. Thus, the actual cooking surface can be a continuous planar area. However, in that the generated induction field of each heating unit has a downwardly as well as upwardly directed component, the units could not be held in position against the glass surface by an arrangement which included materials disposed sub-adjacent the heating unit that would intercept the induction field and become heated therefrom, i.e., generally including any metals. Thus, heretofore as exemplified by the commercial embodiment of a cooking surface utilizing induction heating units and manufactured by the assignor of the present invention, the heating coils were sandwiched between the undersurface of the glass and a Transite sheet, such as disclosed in U.S. Pat. No. 3,796,850 having a common assignee, with the Transite sheet extending laterally beyond the fringes of the flux field to permit it to be engaged by a metal framework which then urged the Transite sheet towards the glass to maintain the coil in this position by a squeezing force. However, it was found that during shipment, the shock forces encountered by such an arrangement permitted the lateral displacement of the heating unit to the extent that upon reaching its destination the heating unit was not in alignment with the indicia on top of the cooking surface indicating the cooking area. This then required a service call to realign the heating unit with such indicia.

Further, the ceramic sheet was typically framed by a stainless steel trim piece and, in that it is important to prevent any spillage from leaking between the trim and the glass to the space below generally housing the electrical components, the trim was sealed to the glass by depositing therebetween a bead of self-curing silicone adhesive. This required certain special handling in the assembly of the trim to the glass and further required a certain time delay for the adhesive to become cured.

Also, although the glass cooking surface had sufficient strength, even though only partially supported over its lateral extent by the sub-adjacent framework, to withstand a standard safety test against breakage by objects being dropped thereon, with the electrical equipment being generally disposed in a space immediately below the cooking surface, it remained possible for an uncommon accident to break through the glass surface and thereby expose the electrical equipment.

SUMMARY OF THE INVENTION

The invention provides a support plate preferably a molded glass-filled plastic, generally disposed in a supportive position sub-adjacent the ceramic cooking sheet and extending, at least in one dimension, from adjacent the flanges on opposing sides of the peripheral trim for engagement therewith through fastening means that, in addition to drawing the flange and support plate together, draw the trim and ceramic sheet tightly together to effect, in cooperation with a peripheral gasket, a sealing engagement therebetween. Further, the support plate defines indexng portions for receiving he heating units in predisposed areas corresponding to the identified cooking areas on the sheet, and a support bar spanning the cooking areas and removably secured to the support plate to vertically hold each unit in place. Finally, the plate provides vertical support to strengthen the assembled top against breakthrough caused by the dropping of uncommonly heavy objects thereon. By virtue of the invention, the ceramic sheets can be disposed within the confines of the peripheral trim, the support plate then attached to the trim and the heating units positioned by the indexing means of the support plate and against the glass sheet and held there by a support bar to define an assembled top that can subsequently be mated with a supporting unit such as a free standing frame generally enclosing the electrical components.

DESCRIPTION OF THE DRAWINGS

FIG. 1 is a bottom plan view of the assembly of the present invention;

FIG. 2 is a cross-sectional view taken along line II—II of FIG. 1 in its proper orientation so that the glass surface defines the top surface; and FIG. 3 is a cross-sectional view along line III—III of FIG. 1 showing the fastening arrangement of the present invention.

DESCRIPTION OF THE PREFERRED EMBODIMENT

Referring initially to FIG. 1, the top assembly 10 of the present invention, as seen in the assembled form from the undersurface side, includes a generally rectangular sheet of glass ceramic 12 defining a generally smooth, planar surface on both sides with indicia 13 visible from the upper surface for identifying the actual cooking areas over which the cooking vessels are to be placed to intercept the induction field. As illustrated the sheet has provisions for four heating units with the assembly being completed with respect to only the two units on the left. In such assembled relationship, it is noted that the glass 12 is bounded about its peripheral edge by a stainless steel trim piece 14 and is supported by a plate 16 which provides a generally planar surface in facing relationship with the undersurface of glass 12 extending at least across one dimension of the glass top so as to have sides 18 in generally facing engagement with opposite flanges of the trim 14. The support plate is preferably molded of plastic such as a glass reinforced polyester so as to retain its strength under relatively high temperature conditions and, as seen in FIG. 1, defines a pair of openings 22 each in registry with the indicia on the glass which defines the cooking area. Openings 22 are configured so as to be able to receive therein the working coil 24 of the induction heating unit sometimes referred to herein as a heating unit such as the molded coil described in previously identified U.S. patent. A support bar 26 (only one being shown) is removably attached to the undersurface of support plate 16 as by screws so as to span each opening 22 and retain the coil therein against vertical displacement and in facing engagement with the undersurface of the glass sheet. Finally, to complete the assembly, the facing surfaces of the flange of the trim 14 and adjacent side of the support plate are respectively secured together through a screw-type fastening means 28 appropriately spaced so as to be able to support the glass, support plate, heating units, and support bar, from the trim and having a particular configuration to be more fully described.

The peripheral trim of the commercially available induction range of the assignor corporation of the present invention, defines on its upper surface an area for slidably receiving thereon manual controls for each unit with the appropriate electrical apparatus disposed immediately therebelow.

Reference is now made to FIG. 2 which shows a cross-section through the assembly in this area where the trim member 14 also forms the sliding surface on which the manual controls are disposed. (Generally on opposite ends of the ceramic sheet). Therefore, the trim member 14 has a generally downwardly open channel configuration as at 26 defined by a pair of spaced opposing legs, 28, 30, and a top cross-piece 32 having a slight indentation 34 formed therein defining the guide for the movable controls (not shown). The top 32 extends outwardly from the legs to define shoulders 36, 38 with the outer shoulder 36 overlapping a countertop and the inner shoulder 38 overlapping the peripheral area of the upper surface of the glass sheet 12. It will be noted in this view that a gasket 40 is disposed about the peripheral edge of the glass sheet so as to be between the shoulder 38 and the upper surface of the glass and between the lower surface of the glass 12 and the support plate 16. It is to be understood that this gasket 40 extends about the entire periphery of the glass sheet to promote the sealed engagement therearound. Also, it will be noted that the support plate 16 includes a stepped configuration as at 42 so as to define an integral generally horizontally extending member 44 that covers the open channel defined by the legs of the trim to provide a generally closed box arrangement for housing appropriate electrical control components (not shown) immediately below the sliding controls.

The coil receiving openings 22 formed in the support plate 16 have a notched configuration as at 46 adjacent the upper surface of the support plate to define a peripheral shoulder for receiving a copper ring 48 which heretofore was included in the coil mold and provides a safety device to limit the stray induction field. The support bar 26 spanning the opening 22 to retain the coil in facing engagement with the glass sheet 12 is, in the preferred embodiment, a molded glass-filled plastic bar attached to the undersurface of the plate 16 as by screws 50 and on which is mounted the pan detection device of the previously identified U.S. Pat. No. 3,796,850. In this manner, the support bar functions both as a retaining means for the working coil and as a mounting support for the pan detecting components specifically identified in the referenced patent.

The connection between the trim member 14 and the support plate is more clearly shown in FIG. 3 wherein it is seen that the trim member 14 has a generally T-shaped configuration which is typical along all edges other than those having the manual sliding controls. Thus, the trim includes a downwardly-extending flange 52 and a horizontally-extending cross member 54 which again provides a shoulder 56 for engagement with external planar structure such as a counter and an internal shoulder 58 overlapping the glass surface in the same manner previously described. The support plate 16, at least along the side adjacent the flange 52 provides an area of increased thickness 60 for added strength in the area of attachment and a downwardly extending peripheral lip 62 which, in the assembled position shown, provides abutting facing engagement with the downwardly extending flange 52 of the trim 14. The thickened peripheral area of the support plate includes threaded vertical apertures 64 for receipt therein of a screw 66. A mounting tab 68, defining a right-angled stepped configuration having a first planar portion 70 for supporting abutment of the undersurface of the support plate 16 and a second planar portion 72 for supporting abutment of the undersurface of the peripheral lip 62 of the plate, with these two last-named portions joined by an intermediate web 74 and the terminal end of the clip defining a right angle shoulder 76 with respect to planar portion 72. It will be noted that an aperture 78 in the flange 52 of the trim member is disposed so as to be in alignment with the undersurface of the peripheral lip 62 of the support plate, with the vertical distance between the undersurface of the lip and the bottom edge of the aperture being somewhat less than the thickness of the support clip 68. Thus, prior to final secured assembly, the clip can be inserted into the aperture 78 with the shoulder 76 of the clip extending therethrough and the clip assuming an orientation whereby the plate engaging surfaces are angularly disposed relative to the support plate. The bottom edge of the aperture 78 in the flange provides a fulcrum about which the clip 68 is then rotated for the proper final facing engagement with the support plate; however, by rotating the clip to this position the support plate is urged upwardly to accommodate the thickness of the clip between the bottom lip of the support plate and the bottom edge of the aperture so that the peripheral gasket material disposed between the trim and the glass and also between the glass and the support plate is urged to compress to insure a sealed condition therealong. In the final position of the clip, an aperture 80 in the support plate engaging portion is aligned with the threaded aperture in the support plate so as to permit the screw 66 to be threadedly inserted to complete the attachment. It is seen that through this arrangement, the generally flexible flange of the trim is strengthened by virtue of its facing engagement on one side with the support plate and its retention in this position by the downwardly depending shoulder 76 of the clip, and the gasket is resiliently compressed to insure a peripherally sealed engagement between the trim and the glass. Thus, with this final assembly step, it is seen that the trim, the ceramic sheet and the support plate are securely jointed together. Further, with the coil disposed in the openings 22 defined by the support plate and then the support bar 26 secured thereto as previously described, the cooking surface assembly is complete for mounting on a frame or support surface with each coil being readily disassembled for individual servicing if necessary without disturbing any other of the assembled parts. The assembly of the present invention, in addition to locating the heating unit, supporting the glass sheet and providing an attachment that permits a peripheral sealed engagement without adhesives, is seen to provide integral structure forming the bottom of the compartment housing electrical components associated with the manual slide controls and also permits the copper ring heretofore retained in the mold surrounding the heating coil, to be disposed on the plate as a much less expensive manufacturing step.

What we claim is:

1. A cooking surface assembly comprising an uninterrupted planar cooking top for supporting utensils containing foodstuffs to be heated, a plurality of heating units disposed adjacent the undersurface of said cooking top; a peripheral trim member for framing the periphery of said cooking top; a peripheral gasket interposed between said trim member and said top for a generally sealed interface betweem said trim and said top; a support plate disposed subadjacent said top and defining means for receiving and locating said heating units and permitting installation and removal of said heating units from below said support plate; means attached to said support plate for releasably supporting said heating units against the undersurface of said top, said support plate further defining means for facing engagement to at least selected portions of said peripheral trim and, fastening means for joining said plate to said trim along said portions of facing engagement, said fastening means in the final assembled position concomitantly providing a compressive force to said gasket.

2. A cooking surface assembly according to claim 1 wherein said support plate comprises a generally planar molded plastic member disposed subadjacent said top and dimensioned so as to extend substantially across at least opposing flange areas of said peripheral trim and defining a downwardly extending surface adjacent the opposing flange areas for said facing engagement between said trim and said plate.

3. Structure according to claim 2 wherein said means for receiving and locating said heating units comprises openings in said plate generally coextensive with said heating units for receipt therein of said units, said openings being in registry with indicia on said top defining said cooking area.

4. A cooking surface assembly according to claim 3 wherein said fastening means comprises a clip member having a lip portion received in an aperture in the flange of said trim, and a free end extending inwardly of said flange, said free end having a plate support area for engagement with the undersurface of said plate and an aperture in alignment with a generally vertically disposed threaded opening in said plate for receipt therethrough of a screw whereby as said screw is tightened upwardly, said support area thereof supportingly engages said plate with an upward force to compress said gasket and said flange is drawn inwardly by said lip.

5. A cooking surface assembly as set forth in claim 4 wherein the upper surface of said support plate engages the lower surface of said cooking top to assist said top in supporting loads imposed thereon, and a gasket also is interposed between the periphery of said cooking top and said support plate, said clip member compressing both of said gaskets.

6. A cooking surface assembly for an induction range comprising:

a smooth-top ceramic cooking surface;

a generally planar support plate disposed subadjacent said cooking surface to support a substantial area of said surface, said plate being generally coextensive with said surface in at least one dimension;

a peripheral trim framing said cooking surface and having a first portion overlapping the peripheral area of said surface and a second portion in facing relation to said plate;

a peripheral gasket interposed between said trim and said surface to effect a generally sealed juncture about said periphery;

induction heating units;

openings in said plate for receipt therein of said heating units against the undersurface of said top and in proper registry with indicia on said top identifying the cooking area, said openings preventing said heating units from shifting out of proper registry;

means for releasably retaining said heating units in said openings against said top; and means for attaching said trim to said plate in areas of said facing relation, said means concomitantly compressing said gasket between said overlapping portion of said trim and said peripheral area of said top.

7. Structure according to claim 6 wherein said support plate comprises a molded plastic member.

8. Structure according to claim 7 wherein said trim defines, at least along a portion of one edge of said top, a downwardly open channel and wherein said plate includes an extension outwardly beyond said edge of said top to close the normally open channel and thereby, in conjunction with said trim, provides an enclosed volume immediately below said trim.

* * * * *